United States Patent [19]

Lyon

[11] Patent Number: 5,583,287
[45] Date of Patent: Dec. 10, 1996

[54] DRAINAGE AND PRESSURE RELIEF VENT FOR A SENSOR

[75] Inventor: Timothy P. Lyon, Dearborn, Mich.

[73] Assignee: Chrysler Corporation, Auburn Hills, Mich.

[21] Appl. No.: 345,050

[22] Filed: Nov. 25, 1994

[51] Int. Cl.$^6$ ............................................. G01M 19/00
[52] U.S. Cl. ........................................................ 73/118.1
[58] Field of Search ................................... 73/118.1, 493

[56] References Cited

U.S. PATENT DOCUMENTS

| | | |
|---|---|---|
| 4,446,755 | 5/1984 | Takahashi . |
| 4,759,212 | 7/1988 | Sawada et al. ............ 73/118.1 |
| 4,875,391 | 10/1989 | Leising et al. . |
| 4,890,540 | 1/1990 | Mullins . |
| 4,901,562 | 2/1990 | Beakas et al. ............ 73/118.1 |
| 4,901,683 | 2/1990 | Huff . |
| 4,967,594 | 11/1990 | Ehrenfried et al. . |
| 5,020,361 | 6/1991 | Malecki et al. ............ 73/118.1 |
| 5,054,281 | 10/1991 | Mutch . |
| 5,054,686 | 10/1991 | Chuang . |
| 5,071,161 | 12/1991 | Mahon et al. . |
| 5,081,886 | 1/1992 | Person et al. ............ 477/131 |
| 5,150,297 | 9/1992 | Daubenmier et al. ........... 477/155 |
| 5,172,787 | 12/1992 | Kobayashi ............ 180/197 |
| 5,184,506 | 2/1993 | Asada ............ 73/118.1 |
| 5,263,366 | 11/1993 | Sakamoto ............ 73/118.1 |
| 5,303,616 | 4/1994 | Palansky et al. ............ 477/63 |
| 5,389,046 | 2/1995 | Timte et al. ............ 475/146 |
| 5,407,024 | 4/1995 | Watson et al. ............ 180/197 |
| 5,426,587 | 6/1995 | Imai ............ 73/118.1 |
| 5,454,259 | 10/1995 | Ishii et al. ............ 73/118.1 |

Primary Examiner—Richard Chilcot
Assistant Examiner—Eric S. McCall
Attorney, Agent, or Firm—Thomas G. Pasternak

[57] ABSTRACT

A sensor is operably disposed within an environment containing a fluid including a sensing mechanism, a housing containing the sensing mechanism, a cavity intraposed between the sensing mechanism and the housing, and a vent for draining fluid from the cavity back to the environment.

12 Claims, 2 Drawing Sheets

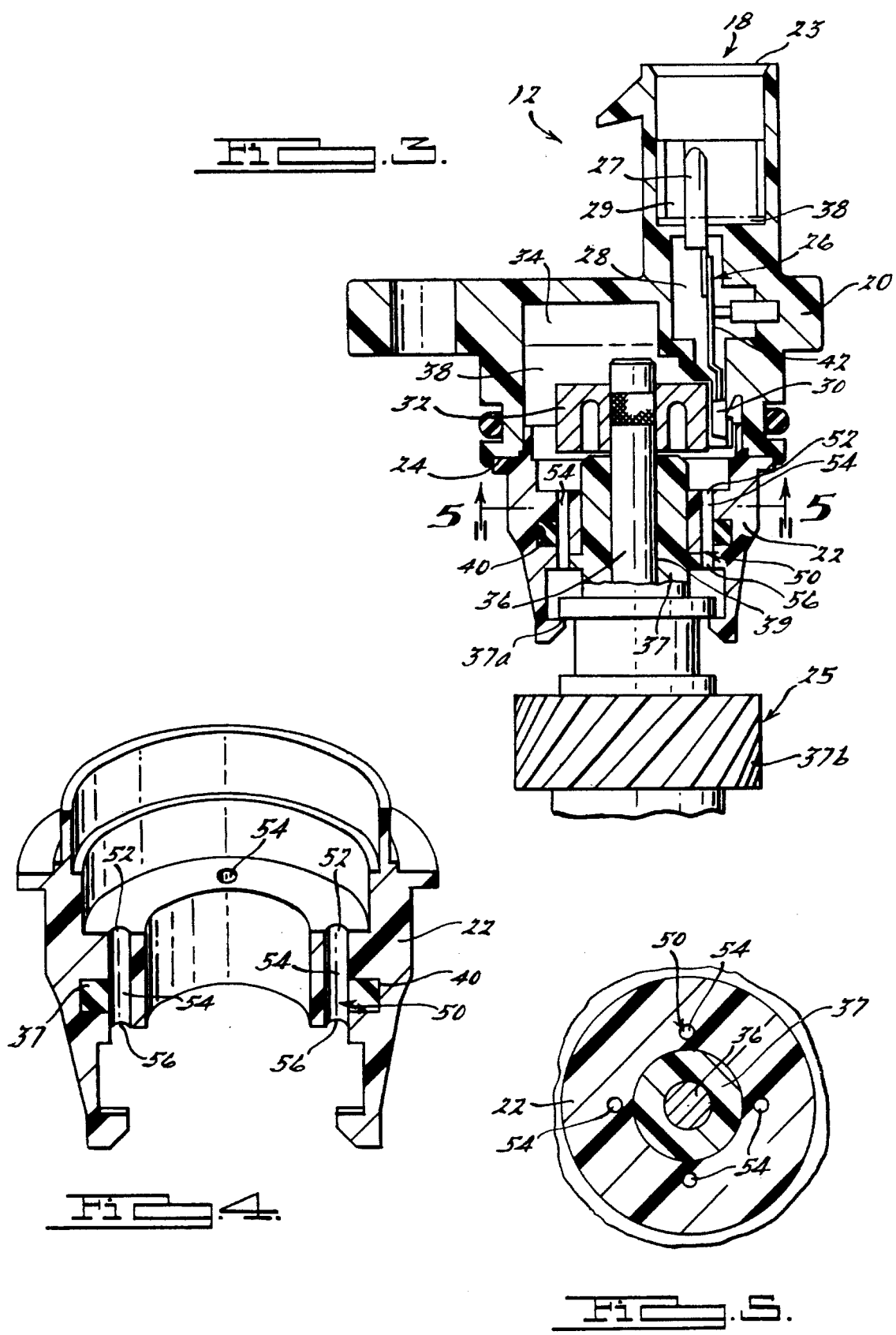

5,583,287

DRAINAGE AND PRESSURE RELIEF VENT FOR A SENSOR

BACKGROUND OF THE INVENTION

1. Field of the Invention

The present invention relates generally to sensors for transaxles and, more particularly, to a drainage and pressure relief vent in a vehicle speed sensor for a transaxle of a motor vehicle.

2. Description of the Related Art

Sensors are typically used in a variety of applications, including motor vehicles. The environment in which the vehicular sensor may be subject to is also varied, and may involve temperature extremes, moisture, and fluids such as oils or fuels. The sensor may require protection from its environment in order to preserve its functionality.

Motor vehicles, including those having front wheel drive or four wheel drive transaxles, utilize an electromechanical speed sensor to provide vehicle speed information for a speedometer system of the vehicle. For a front wheel drive motor vehicle, the vehicle speed sensor is mounted in an extension housing of the transaxle (a transmission mounted across the axle), and for a four wheel drive motor vehicle, the vehicle speed sensor is mounted on a differential for the transaxle. The vehicle speed sensor is driven directly by a driveshaft of the transaxle, and generates a predetermined number of pulses per sensor shaft rotation. The vehicle speed sensor itself is protected by an external housing. There may be an empty space or cavity created between the vehicle speed sensor itself and the external housing. An example of a transaxle and vehicle speed sensor is disclosed in U.S. Pat. No. 4,875,391 to Leising et al., the disclosure of which is hereby incorporated by reference.

The transaxle contains hydraulic fluid to lubricate and protect its moving parts. It is possible for hydraulic fluid to enter the vehicle speed sensor through one or more possible locations: along a shaft bearing surface due to pumping or wicking action; along a lower external housing interface due to molding irregularities; and along an ultrasonic weld bonding an upper body portion to a lower body portion of the external housing. The hydraulic fluid that enters the vehicle speed sensor tends to accumulate in the cavities therein. This may result in several undesirable conditions: a fluid leak, fluid wicking into a connector or wiring harness of the vehicle speed sensor and connector sealing problems.

SUMMARY OF THE INVENTION

It is, therefore, one object of the present invention to provide a drainage and pressure relief vent for a sensor.

It is another object of the present invention to equalize differential pressure between a fluid-filled cavity contained within a sensor and an external environment of the sensor.

It is yet another object of the present invention to provide for venting of hydraulic fluid that has entered into a vehicle speed sensor mounted on a transaxle.

To achieve the foregoing objects, the present invention is a sensor operably disposed within an environment containing a fluid including a sensing mechanism and a housing containing the sensing mechanism. The sensor also includes a cavity intraposed between the sensing mechanism and the housing and a vent for draining fluid from the cavity back to the environment.

One advantage of the present invention is that a drainage and pressure relief vent is provided for a sensor. Another advantage of the present invention is that the vent allows for draining of fluid that may have accumulated in a cavity of the sensor. Yet another advantage of the present invention is that the vent equalizes the differential pressure between the sensor and the sensor's external environment. A further advantage of the present invention is that the vent improves the endurance and reliability of the sensor by eliminating fluid leaks, fluid wicking into the connector or wiring harness, and connector sealing problems. A still further advantage of the present invention is that the vent provides a simple, yet cost effective way of improving the reliability of the sensor.

Other objects, features and advantages of the present invention will be readily appreciated as the same becomes better understood after reading the subsequent description taken in conjunction with the accompanying drawings.

BRIEF DESCRIPTION OF THE DRAWINGS

FIG. 3 is a fragmentary elevational view of the vehicle speed sensor of FIG. 2.

FIG. 4 is a sectional view of a sensor body for the vehicle speed sensor of FIG. 3.

FIG. 5 is sectional view taken along line 5—5 of FIG. 3.

DESCRIPTION OF THE PREFERRED EMBODIMENT(S)

Figure 1:
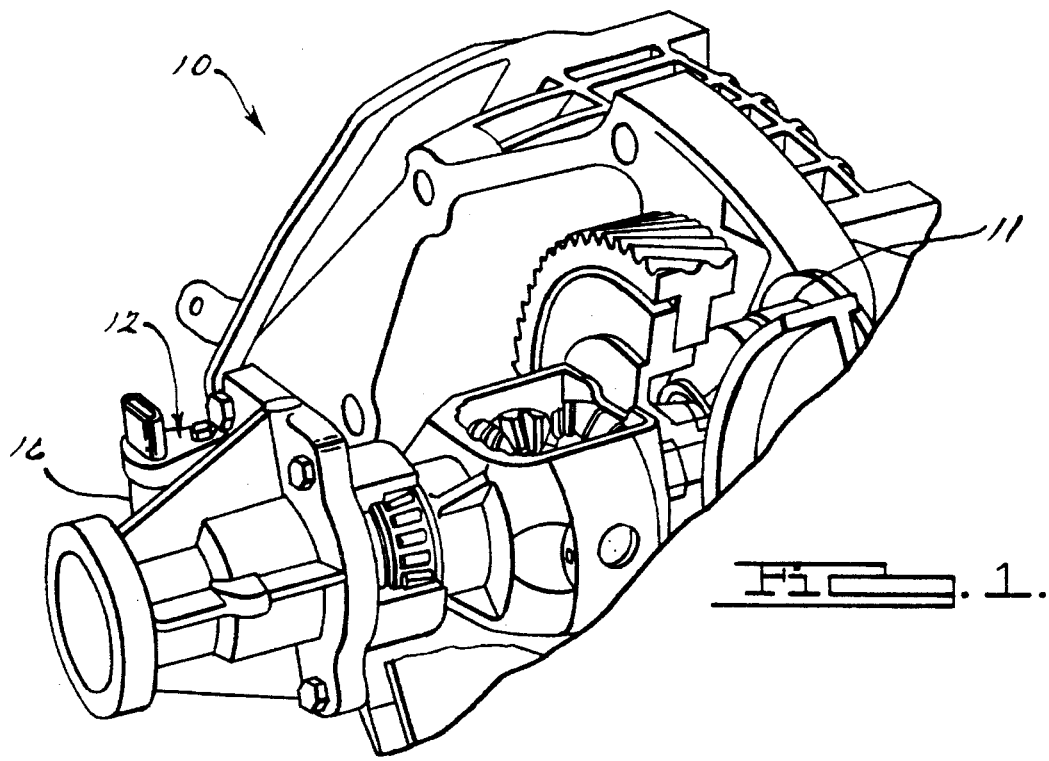
FIG. 1 is a partial fragmentary perspective view of a transaxle for a motor vehicle.

Referring to FIG. 1, a transaxle 10 is shown for a motor vehicle such as an automotive vehicle (not shown). The transaxle 10 has a transmission 11 which is preferably mounted east-west across an axle (not shown) of the vehicle, and converts engine torque and speed generated by a powerplant (not shown) into usable power to wheels of the vehicle for controlling movement of the vehicle. A vehicle speed sensor, according to the present invention and generally indicated at 12, is mounted onto an extension housing 16 of the transaxle 10. It should be appreciated that the vehicle speed sensor 12 may also be mounted onto a differential (not shown but well known in the art) of the transaxle 10 for a four wheel drive vehicle. It should also be appreciated that a signal from the vehicle speed sensor 12 provides an engine controller (not shown but well known in the art) with vehicle speed information.

Figure 2:
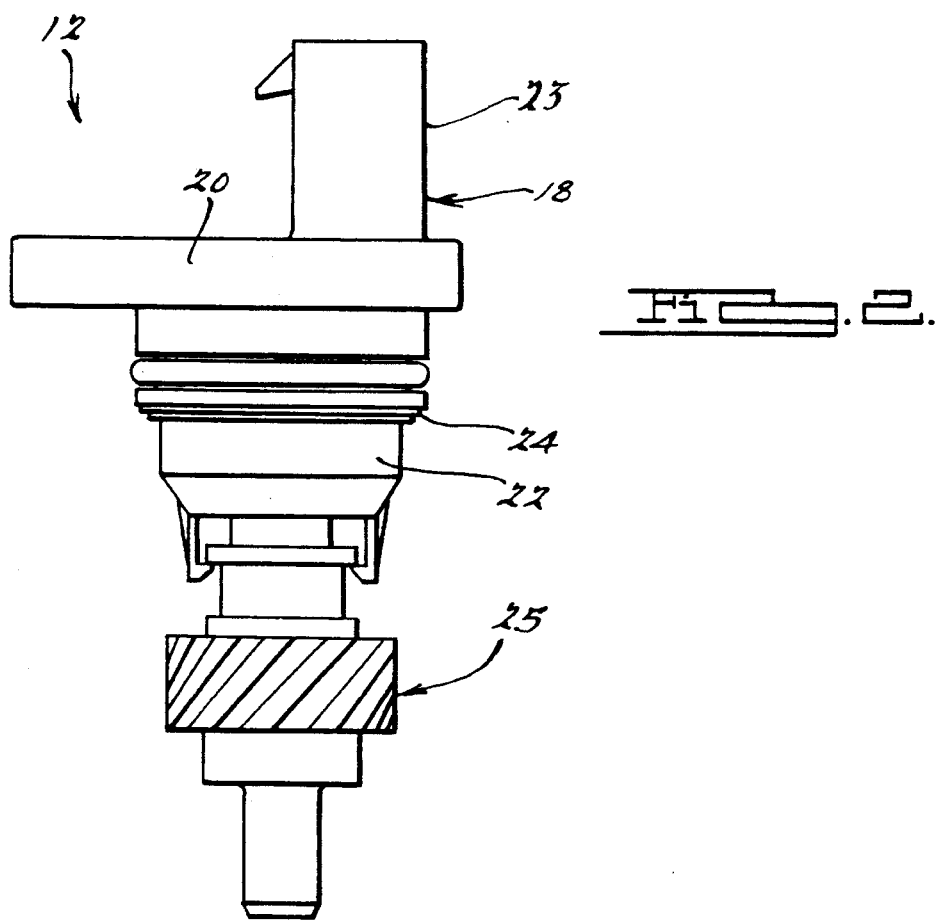
FIG. 2 is an elevational view of a vehicle speed sensor, according to the present invention, mounted onto the transaxle of FIG. 1.

Referring to FIG. 2, the vehicle speed sensor 12 includes a sensor body, generally indicated at 18, having an upper body portion 20 and a lower body portion 22. The upper body portion 20 includes a connector portion 23. The upper body portion 20 is joined to the lower body portion 22 such as by ultrasonic welding and results in a weld joint 24 therebetween. The sensor body 18 may be formed from metal, plastic or any other suitable material. It should be appreciated that ultrasonic welding is one technique of joining the upper body portion 20 to the lower body portion 22 and that other suitable techniques may be used.

The vehicle speed sensor 12 includes a sensor shaft, generally indicated at 25, operably attached to the sensor body 18. The sensor shaft 25 is driven by an output or drive shaft of the transmission 11. The vehicle speed sensor 12 generates a predetermined number of pulses per sensor shaft 25 rotation and sends a signal to a controller for processing as is known in the art.

Referring to FIG. 3, the vehicle speed sensor 12 includes a sensing mechanism, generally indicated at 26, which generates the predetermined number of pulses per sensor shaft rotation. The sensing mechanism 26 is well known in the art and, for this example, includes a terminal pin 27 and a batman assembly 28. The terminal pin 27 protrudes into a terminal connector cavity 29 of the connector portion 23 from an upper portion of the batman assembly 28. The sensing mechanism 26 also includes a hall effect cell 30 affixed to a lower portion of the batman assembly 28. Adjacent to the hall effect cell 30, the sensing mechanism 26 includes a plurality of magnets 32 disposed in a hall effect cell cavity 34. The magnets 32 surround a shaft 36 of the sensor shaft 25 which extends axially through the joined upper body portion 20 and lower body portion 22. The upper end of the shaft 36 protrudes into the hall effect cell cavity 34. The sensor shaft 25 includes a bearing 37 surrounding the shaft 36. The bearing 37 is retained axially to the lower body portion 22 by a flange interface 37a. It should be appreciated that the bearing 37 rotates relative to the lower body portion 22. It should also be appreciated that the bearing 37 has a gear 37b that engages a gear portion (not shown) of an output shaft of the transmission 11.

Since the vehicle speed sensor 12 is installed in a location such as the extension housing 16 of the transaxle 10, it is subject to hydraulic fluid 38 normally contained within the transaxle 10. During vehicle operation, the hall effect cell cavity 34 may become filled with hydraulic fluid 38. The hydraulic fluid 38 may enter the vehicle speed sensor 12 via several possible routes. For instance, hydraulic fluid 38 may be pumped or wicked along a bearing surface 39 between the shaft 36 and the bearing 37. The hydraulic fluid 38 may also enter the vehicle speed sensor 12 at an interface 40 between the bearing 37 and the lower body portion 22 due to molding tolerances. The hydraulic fluid 38 may further enter the vehicle speed sensor 12 at the ultrasonic weld joint 24.

As the hall effect cavity 34 becomes filled with hydraulic fluid 38, and with the addition of heat resulting from the operation of the vehicle, the hydraulic fluid 38 may be pushed out of the hall effect cell cavity 34 along the batman assembly 28 and into the terminal connector cavity 29, the void surrounding the terminal pin. 26. Another potential fluid path is around the terminal strip and hall effect cell leads 42. These examples of fluid paths are for illustration purposes, other fluid paths are possible depending on the configuration of the sensing mechanism 26.

Hydraulic fluid 38 in the terminal connector cavity 29 is undesirable because it may result in several conditions, which may include a fluid leak from the vehicle speed sensor 12, fluid wicking into a connector or wiring harness (not shown) to be attached to the terminal pin 26, and connector sealing problems. It should be appreciated that there is a positive pressure in the hall effect cell cavity 34 and a generally lower pressure or vacuum in the transaxle 10 where the vehicle speed sensor 12 is located.

Referring to FIGS. 3 through 5, the vehicle speed sensor 12 includes a drainage and pressure relief vent, generally indicated at 50, within the lower body portion 22 to equalize the differential pressures and allow the hydraulic fluid 38 to drain back into the transaxle 10. The vent 50 includes at least one, preferably a plurality of ducts 54 having an upper opening 52 communicating with the hall effect cell cavity 34 at one end and a lower opening 56 communicating with the external housing 16 at the other end. As illustrated in FIG. 5, the lower body portion 22 includes four ducts 54 having a diameter of approximately 0.080"–0.100" each. However, the number of ducts and size are for this particular example.

As a result of the drainage and pressure relief vent 50, hydraulic fluid 38 is allowed to drain back into the transaxle 10 and is prevented from entering the terminal connector cavity 29. It should be appreciated that the number of ducts 54, size and shape will vary depending on the configuration of the vehicle speed sensor 10 and the potential for fluid flow into the vehicle speed sensor 10. It should also be appreciated that the drainage and vehicle speed pressure relief vent 50 can be implemented in other types of sensors that may be subject to conditions where fluid may inadvertently flow into the sensor.

The present invention has been described in an illustrative manner. It is to be understood that the terminology which has been used is intended to be in the nature of words of description rather than of limitation.

Many modification and variations of the present invention are possible in light of the above teachings. Therefore, within the scope of the appended claims, the present invention may be practiced otherwise than as specifically described.

What is claimed is:

1. A sensor operably connected to a fluid filled environment comprising:

a sensing mechanism;

a sensor housing containing said sensing mechanism;

a cavity disposed within said sensor housing between said sensing mechanism and a portion of said sensor housing, whereby fluid from the environment has entered said cavity; and at least one drainage and pressure relief vent within the portion of said sensor housing and extending from said cavity through the portion of said sensor housing for draining the fluid from said cavity through said at least one drainage and pressure relief vent and into the environment as a differential pressure between the cavity and the environment equalizes.

2. A sensor as set forth in claim 1 wherein said at least one drainage and pressure relief vent comprises at least one duct extending from an upper opening in said cavity to a lower opening in said sensor housing.

3. A sensor as set forth in claim 1 wherein said sensor housing comprises an upper body portion and a lower body portion welded to said upper body portion.

4. A sensor as set forth in claim 3 wherein said at least one drainage and pressure relief vent comprises a plurality of ducts in said lower body portion and circumferentially disposed thereabout.

5. A sensor as set forth in claim 4 wherein said plurality of ducts comprises four ducts.

6. A sensor as set forth in claim 1 wherein said sensing mechanism is a vehicle speed sensor.

7. A sensor operably connected to a fluid filled member, comprising:

a sensing mechanism;

a sensor body having an upper body portion and a lower body portion surrounding said sensing mechanism;

a cavity disposed within said sensor body between said sensing mechanism and said upper and lower body portion of said sensor body, whereby fluid from the fluid filled member has entered said cavity; and a drainage and pressure relief vent extending from said cavity through said lower body portion of said sensor body for venting the fluid from said cavity through said vent and into the member as a differential pressure between the cavity and the member equalizes.

8. A sensor as set forth in claim 7 wherein said vent comprises at least one duct extending from an upper opening in said cavity to a lower opening in said housing.

9. A sensor as set forth in claim 7 wherein said vent comprises a plurality of ducts extending from an upper opening communicating with said cavity to a lower opening communicating with the member.

10. A sensor as set forth in claim 9 wherein said plurality of ducts comprises four ducts.

11. A sensor as set forth in claim 7 wherein said sensing mechanism is a vehicle speed sensor.

12. A vehicle speed sensor operably connected to a transaxle containing a fluid, comprising:

a vehicle speed sensing mechanism;

a sensor body for containing said vehicle sensing mechanism having an upper body portion and a lower body portion;

a cavity disposed within said sensor body between said vehicle speed sensing mechanism and said sensor body, whereby fluid from the transaxle has entered said cavity; and a plurality of passageways within the sensor body extending from an upper opening communicating with said cavity to a lower opening communicating with the transaxle, whereby a positive pressure within the cavity and a lower pressure within the transaxle creates a differential pressure wherein the fluid passes from the cavity through the vent and into the transaxle as the differential pressure equalizes.

* * * * *